(12) United States Patent
Kwon et al.

(10) Patent No.: US 9,317,063 B2
(45) Date of Patent: Apr. 19, 2016

(54) DISPLAY PANEL AND DISPLAY DEVICE HAVING THE SAME

(71) Applicant: SAMSUNG DISPLAY CO., LTD., Yongin, Gyeonggi-Do (KR)

(72) Inventors: Dae-Heon Kwon, Gyeonggi-do (KR); Sung-Won Bae, Gyeonggi-do (KR); Min-Jae Kim, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 31 days.

(21) Appl. No.: 14/305,686

(22) Filed: Jun. 16, 2014

(65) Prior Publication Data
US 2015/0009425 A1 Jan. 8, 2015

(30) Foreign Application Priority Data
Jul. 4, 2013 (KR) .................. 10-2013-0078229

(51) Int. Cl.
*G02F 1/1335* (2006.01)
*G02F 1/133* (2006.01)
*G06F 1/16* (2006.01)
*G02F 1/1333* (2006.01)
*G02F 1/1343* (2006.01)
*H04R 1/02* (2006.01)
(Continued)

(52) U.S. Cl.
CPC .......... *G06F 1/1605* (2013.01); *G02F 1/13338* (2013.01); *G02F 1/13439* (2013.01); *G02F 1/133345* (2013.01); *H04R 1/028* (2013.01); *H04R 7/10* (2013.01); *H04R 17/005* (2013.01); *H04R 2201/003* (2013.01); *H04R 2307/025* (2013.01); *H04R 2440/01* (2013.01); *H04R 2499/15* (2013.01)

(58) Field of Classification Search
CPC ............ G02F 1/13338; G02F 1/13345; G02F 1/1333; G02F 2001/13312; G02F 2001/133357; G06F 3/0412; G06F 3/045; G06F 3/044
USPC ..................................... 349/12, 122
See application file for complete search history.

(56) References Cited

U.S. PATENT DOCUMENTS

| 6,427,017 | B1 * | 7/2002 | Toki ...................... B06B 1/0688 181/170 |
| 2005/0112906 | A1 * | 5/2005 | Maekawa .......... H01L 29/66757 438/795 |
| 2006/0210099 | A1 | 9/2006 | Takahata et al. |
| 2007/0046642 | A1 * | 3/2007 | Lee ........................ G06F 3/045 345/173 |

(Continued)

FOREIGN PATENT DOCUMENTS

| JP | 2003102094 | 4/2003 |
| JP | 2003125315 | 4/2003 |

(Continued)

OTHER PUBLICATIONS

European Search Report in corresponding European Patent Application No. 14175500.9-1904 dated Oct. 30, 2014.

(Continued)

*Primary Examiner* — Mike Qi
(74) *Attorney, Agent, or Firm* — F. Chau & Associates, LLC (57) ABSTRACT

A display device includes a speaker film disposed on an upper surface of a first substrate of a main body or a lower surface of a second substrate of a main body. Alternatively, a display device includes a touch screen panel including a speaker film and disposed on an upper surface of the first substrate.

18 Claims, 4 Drawing Sheets

(51) Int. Cl.
*H04R 7/10* (2006.01)
*H04R 17/00* (2006.01)

(56) References Cited

U.S. PATENT DOCUMENTS

| | | | |
|---|---|---|---|
| 2009/0097691 A1 | 4/2009 | Eaton | |
| 2011/0033074 A1* | 2/2011 | Chang | H04R 1/028 381/333 |
| 2011/0128245 A1 | 6/2011 | Andoh et al. | |
| 2015/0103263 A1* | 4/2015 | Han | G06F 1/1643 349/12 |

FOREIGN PATENT DOCUMENTS

| | | |
|---|---|---|
| JP | 2008283350 | 11/2008 |
| KR | 1020070100611 | 10/2007 |
| KR | 1020100128617 | 12/2010 |
| KR | 1020110128968 | 12/2011 |

OTHER PUBLICATIONS

European Search Report in corresponding European Patent Application No. 14175500.9 dated Sep. 10, 2015.

* cited by examiner

DISPLAY PANEL AND DISPLAY DEVICE HAVING THE SAME

This U.S. non-provisional application claims priority under 35 U.S.C. §119 to Korean Patent Application No. 10-2013-0078229, filed on Jul. 4, 2013, the disclosure of which is incorporated by reference herein in its entirety.

TECHNICAL FIELD

Exemplary embodiments of the present invention relate to displays, and more specifically, to a display panel and display device including a speaker.

DISCUSSION OF THE RELATED ART

A flat display device such as an LCD or OLED display has a separate space for a speaker, so that it gets thicker and more complicated in structure.

SUMMARY

In accordance with an exemplary embodiment of the present invention, a display device includes a main body and a speaker film. The main body has a first substrate and a second substrate facing each other. A liquid crystal layer is disposed between the first substrate and the second substrate. The speaker film is disposed on an upper surface of the first substrate.

In an exemplary embodiment of the present invention, the speaker film includes a transparent base substrate and transparent electrodes disposed on two opposite sides of the transparent base substrate.

In an exemplary embodiment of the present invention, the transparent base substrate includes polyethylene, polystyrene, polyethyleneterephthalate, polyester, polyacryl, and/or polyepoxy.

In an exemplary embodiment of the present invention, the transparent electrode includes an ITO, a conductive polymer, fullerene, a carbon nano tube complex, graphene, and/or silicene.

In an exemplary embodiment of the present invention, the speaker film includes a first area and a second area. The first area in which a speaker is formed on an edge of the speaker film. The second area is surrounded by the first area and is configured to vibrate a sound from the speaker.

In an exemplary embodiment of the present invention, the display panel further includes an optical adhesive film between the first substrate and the speaker film.

In accordance with an exemplary embodiment of the present invention, a display device includes a display panel and a touch screen panel. The display panel includes a main body having a first substrate and a second substrate facing each other. A liquid crystal layer is disposed between the first substrate and the second substrate. A speaker film is disposed on an upper surface of the first substrate. The touch screen panel senses a touch position by detecting a change of capacitance.

In accordance with an exemplary embodiment of the present invention, a display device includes a main body and a speaker film. The main body has a first substrate and a second substrate facing each other. A liquid crystal layer is disposed between the first substrate and the second substrate. The speaker film is disposed on a lower surface of the second substrate.

In an exemplary embodiment of the present invention, the speaker film includes a transparent base substrate and transparent electrodes disposed on two opposite sides of the transparent base substrate.

In an exemplary embodiment of the present invention, the transparent base substrate includes polyethylene, polystyrene, polyethyleneterephthalate, polyester, polyacryl, and/or polyepoxy.

In an exemplary embodiment of the present invention, the transparent electrode includes an ITO, a conductive polymer, fullerene, a carbon nano tube complex, graphene, and/or silicene.

In an exemplary embodiment of the present invention, the speaker film includes a first area and a second area. The first area in which a speaker is formed on an edge of the speaker film. The second area is surrounded by the first area and is configured to vibrate a sound from the speaker.

In an exemplary embodiment of the present invention, the display panel further includes an optical adhesive film between the first substrate and the speaker film.

In accordance with an exemplary embodiment of the present invention, a display device includes a display panel and a touch screen panel. The display panel includes a main body having a first substrate and a second substrate facing each other. A liquid crystal layer is disposed between the first substrate and the second substrate. A speaker film is disposed on a lower surface of the second substrate. The touch screen panel senses a touch position by detecting a change of capacitance.

In accordance with an exemplary embodiment of the present invention, a display device includes a display panel and a touch screen panel. The display panel includes a first substrate and a second substrate facing each other. A liquid crystal layer is disposed between the first substrate and the second substrate. The touch screen panel includes a speaker film and disposed on an upper surface of the first substrate.

In an exemplary embodiment of the present invention, the speaker film includes a transparent base substrate and transparent electrodes disposed on two opposite sides of the transparent base substrate.

In an exemplary embodiment of the present invention, the transparent base substrate includes polyethylene, polystyrene, polyethyleneterephthalate, polyester, polyacryl, and/or polyepoxy.

In an exemplary embodiment of the present invention, the transparent electrode includes an ITO, a conductive polymer, fullerene, a carbon nano tube complex, graphene, and/or silicene.

In an exemplary embodiment of the present invention, the speaker film includes a first area and a second area. The first area in which a speaker is formed on an edge of the speaker film. The second area is surrounded by the first area and is configured to vibrate a sound from the speaker.

In an exemplary embodiment of the present invention, the display panel further includes an optical adhesive film between the first substrate and the speaker film.

In accordance with exemplary embodiments of the present invention, a display panel and a display device a speaker film may be disposed on an upper surface of the first substrate of a main body or a lower surface of the second substrate of a main body and a display panel. Alternatively, the display panel and the display device a touch screen panel including a speaker film. The display panel may not need a space to dispose a speaker. Thus, a thickness of the display device may be decreased.

According to an exemplary embodiment of the present invention, a display device comprises a display panel and a speaker film formed on one of two opposite surfaces of the display panel. The speaker film has a first portion and a second portion surrounding the first portion. A speaker is formed in the first portion of the speaker film. The second portion has an empty space.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Various exemplary embodiments of the present invention will be described in detail hereinafter with reference to the accompanying drawings. The present invention, however, may be embodied in many different forms and should not be construed as limited to the exemplary embodiments set forth herein. Like numerals may refer to like or similar elements throughout the specification and the drawings.

It will be understood that when an element is referred to as being "on," "connected to" or "coupled to" another element, it can be directly on, connected or coupled to the other element or intervening elements may be present. As used herein, the singular forms "a," "an" and "the" are intended to include the plural forms as well, unless the context clearly indicates otherwise.

Figure 1:
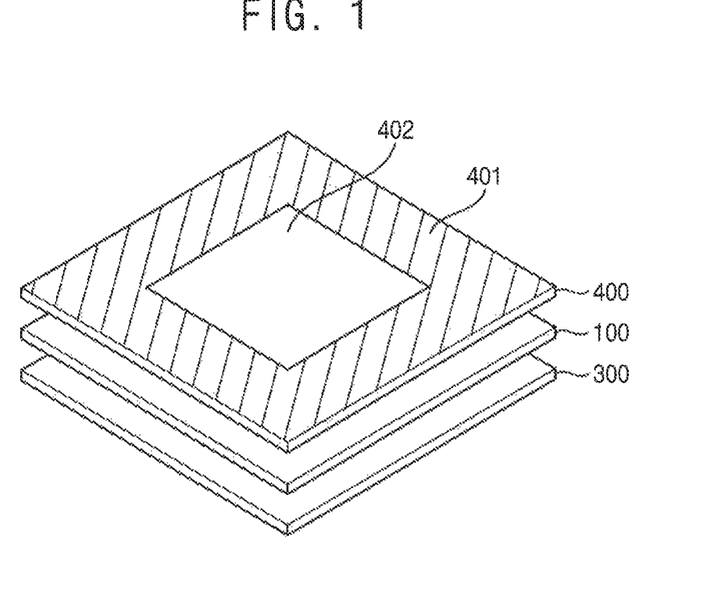
FIG. 1 is a perspective view illustrating a display panel including a speaker film in accordance with an exemplary embodiment of the present invention.
Figure 2:
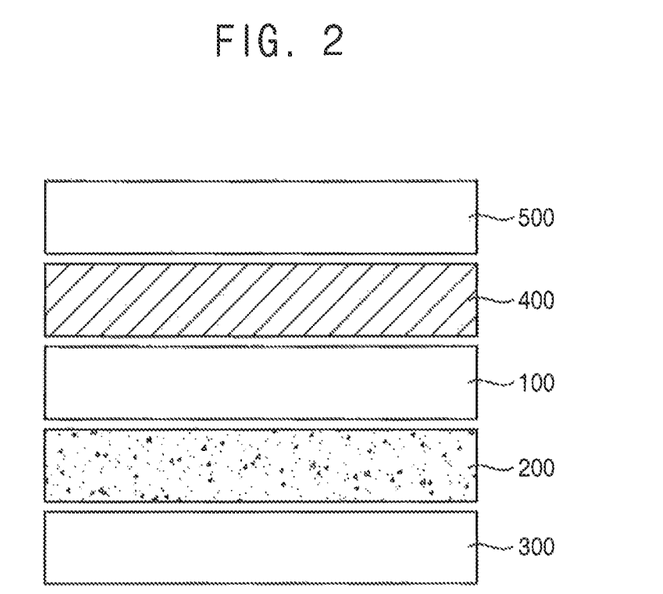
FIG. 2 is a cross-sectional view illustrating a display panel in FIG. 1, according to an exemplary embodiment of the present invention.
Figure 3:
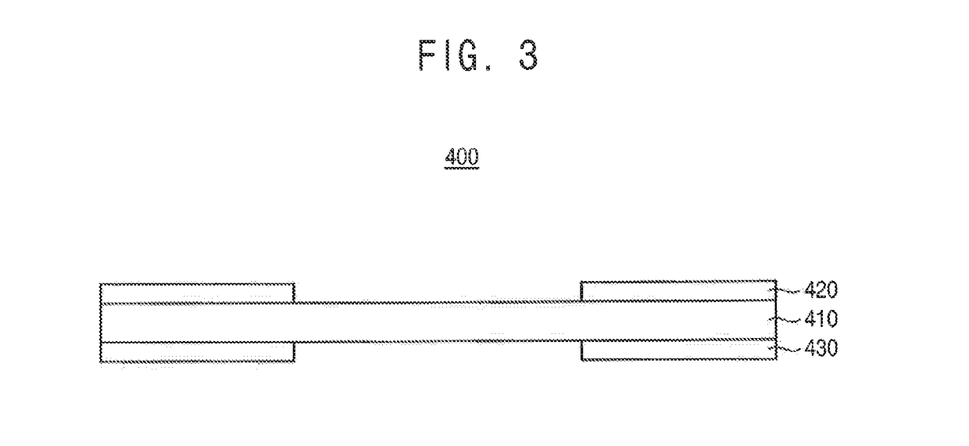
FIG. 3 is a cross-sectional view illustrating a speaker film in FIG. 1, according to an exemplary embodiment of the present invention.

FIG. 1 is a perspective view illustrating a display panel including a speaker film in accordance with an exemplary embodiment of the present invention. FIG. 2 is a cross-sectional view illustrating a display panel in FIG. 1, according to an exemplary embodiment of the present invention. FIG. 3 is a cross-sectional view illustrating a speaker film in FIG. 1, according to an exemplary embodiment of the present invention.

Referring to FIGS. 1 to 3, a display panel includes a main body and a speaker film. The main body includes a first substrate 100 and a second substrate 300 facing each other and a liquid crystal layer 200 disposed between the first substrate 100 and the second substrate 300. The speaker film is disposed on an upper surface of the first substrate 100.

The first substrate 100 and the second substrate 300 may be a transparent insulation substrate. Examples of the first substrate 100 may include, but are not limited to, a glass substrate, a quartz substrate, a transparent resin substrate, etc. The transparent resin substrate may include, but are not limited to, a polyimide resin, an acryl resin, a polyacrylate resin, a polycarbonate resin, a polyether resin, a polyethyleneterephthalate resin, a sulonate resin, etc.

The first substrate 100 may be a thin film transistor substrate. The thin film transistor substrate includes a plurality of transistors (e.g., thin film transistors (TFTs)), which are formed in a matrix shape. The first substrate 100 may include a plurality of gate lines and a plurality of data lines which are connected to the thin film transistors.

The second substrate 300 may be a color filter substrate having color filters. The color filter substrate converts light which is incident from a backlight assembly to light of a desired color. For example, the second substrate 300 may include a first color filter, a second color filter, and a third color filter. The second substrate 300 may further include a black matrix which is disposed between the first, second, and third color filters. For example, the first, second, and third color filters may be a red, green, and blue color filter, respectively. Alternatively, the color filters may be disposed on the first substrate 100.

The first substrate 100 may further include a plurality of pixel electrodes PE which are connected to the thin film transistors, respectively. The second substrate 300 may include a common electrode which faces the pixel electrodes. Alternatively, the common electrode may be disposed on the first substrate 100.

The liquid crystal layer 200 may be disposed between the first substrate 100 and the second substrate 300. The liquid crystal layer 200 may include liquid crystal molecules having an optical anisotropy. The liquid crystal molecules are driven by an electric field, thus transmitting or blocking light.

The speaker film 400 may be disposed on an upper surface of the first substrate 100.

The speaker film 400 may include a transparent base substrate 410 and transparent electrodes 420 and 430 disposed on two opposite sides of the transparent base substrate 410.

The transparent base substrate 410 may be a transparent insulation substrate. The transparent insulation substrate may include an organic material and an inorganic material.

For example, the transparent base substrate 410 may include a polymer. Examples of the transparent base substrate 410 may include, but are not limited to, a photoresist, an acrylate resin, a polyimide resin, a polyamide resin, a siloxane resin, a photosensitive resin including acryl and a carboxyl group, a novolac resin, an alkali-soluble resin, silicon oxide, silicon nitride, silicon oxynitride, silicon oxycarbide, silicon carbonitride, and/or a mixture thereof. For example, the transparent base substrate 410 may include, but is not limited to, polyethylene, polystyrene, polyethyleneterephthalate, polyester, polyacryl, and/or polyepoxy.

The transparent electrodes 420 and 430 may include, but are not limited to, indium tin oxide (ITO), a conductive polymer, fullerene, a carbon nano tube complex, graphene, and/or silicene.

The conductive polymer has electric properties substantially the same as or similar to electric properties of a semiconductor or a metal. The conductive polymer is easy to synthesize. The conductive polymer is flexible and durable. Fullerene is an allotrope of carbon and includes 60 carbon atoms. Fullerene is resistant to a high temperature and high pressure and has a predetermined electric property. The carbon nano tube (CNT) complex has a cylindrical shape. The electrical conductivity of CNT is higher than the electrical conductivity of copper. The mechanical strength of CNT is larger than a superalloy or high-performance alloy. The thermal conductivity of CNT is higher than the thermal conductivity of diamond. CNT has high elasticity and chemical stability.

Graphene has a 2-dimensional structure having a thickness substantially equal to the thickness of a carbon atom. Graphene has carbon atoms arranged in a honeycomb structure. The electrical conductivity of graphene is about 100 times higher than the electrical conductivity of copper. The mechanical strength of graphene is about 200 times larger than the mechanical strength steel. The thermal conductivity of graphene is about twice higher than the thermal conductivity of diamond. Graphene transmits about 98% of light. The structure of silicene is similar to the structure of graphene. Silicon and carbon belong to the third period of the periodic table of the chemical elements. Silicon atoms may be arranged in a honeycomb structure, forming silicene having similar properties to graphene. For example, the transparent electrode may be graphene or silicene.

Graphene and silicene are flexible. Therefore, graphene and silicene may be applied to a flexible speaker film on a flexible substrate.

The transparent electrodes include a first transparent electrode 420 and a second electrode 430 on a transparent base substrate 410. The first transparent electrode 420 may be patterned on a side of the transparent base substrate 410. The second transparent electrode 430 may be patterned on another side of the transparent base substrate 410. The first transparent electrode 420 and the second transparent electrode 430 are disposed on two opposite sides of the transparent base substrate 410.

The speaker film 400 includes a first area 401, in which a speaker is formed, on an edge of the speaker film 400 and a second area 402 which is surrounded by the first area 401. The speaker film 400 is configured to vibrate a sound generated from the speaker.

The first area 401 has a width from the edge of the speaker film 400 toward the center of the speaker film 400. The speaker is formed on the edge of the speaker film 400, and the center of the speaker film 400 has an empty space. A sound generated from the speaker may be vibrated by the empty space of the speaker film 400.

Generally, a speaker generates a sound by magnetic induction between a permanent magnet and a coil. A display device generally has a space to contain a speaker for generating a sound.

Therefore, the display panel according to an exemplary embodiment of the present invention might not have a space to contain a speaker. Thus, the thickness of the display device may be decreased.

When the speaker film 400 is disposed on an upper surface of the first substrate 100 of the display panel, the sound quality of the speaker may be increased. For example, the speaker film 400 is closer to a user, and thus, the speaker film 400 can transmit a sound to the user more effectively.

According to an exemplary embodiment of the present invention, the display device further includes an optical adhesive film between the first substrate 100 and the speaker film 400. The optical adhesive film may be an ultraviolet curable film. The ultraviolet curable film may include an acryl-based polymer, such as oligourethane acrylate, ester acrylate, etc.

In accordance with an exemplary embodiment of the present invention, a display device may include a display panel and a touch screen panel 500. The display panel includes a main body having a first substrate 100 and a second substrate 300 facing each other, a liquid crystal layer 200 disposed between the first substrate 100 and the second substrate 300, and a speaker film 400 disposed on an upper surface of the first substrate 100. The touch screen panel 500 may sense the position of a touch by detecting a change in capacitance.

The display device may further include a window, such as a transparent substrate, on the touch screen panel 500.

The display device may further include a backlight assembly for providing light to the display panel.

The backlight assembly may be disposed on a lower surface of the display panel. The backlight assembly may include a light guide plate, a reflector, and a light source. The light source may be disposed at least a side of the light guide plate and emits light to the light guide plate.

Figure 4:
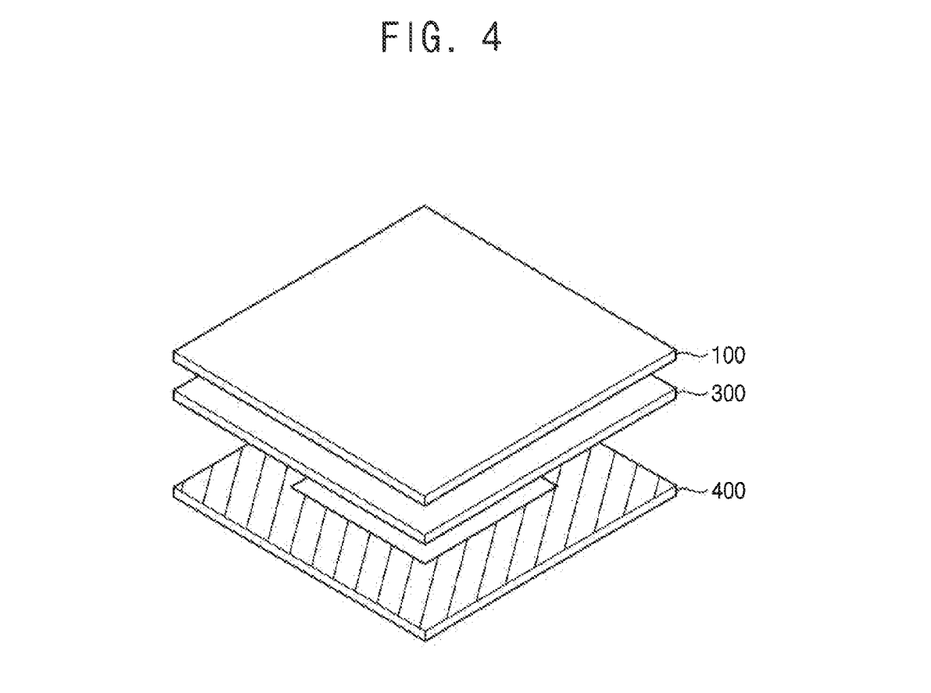
FIG. 4 is a perspective view illustrating a display panel including a speaker film in accordance with an exemplary embodiments of the present invention.
Figure 5:
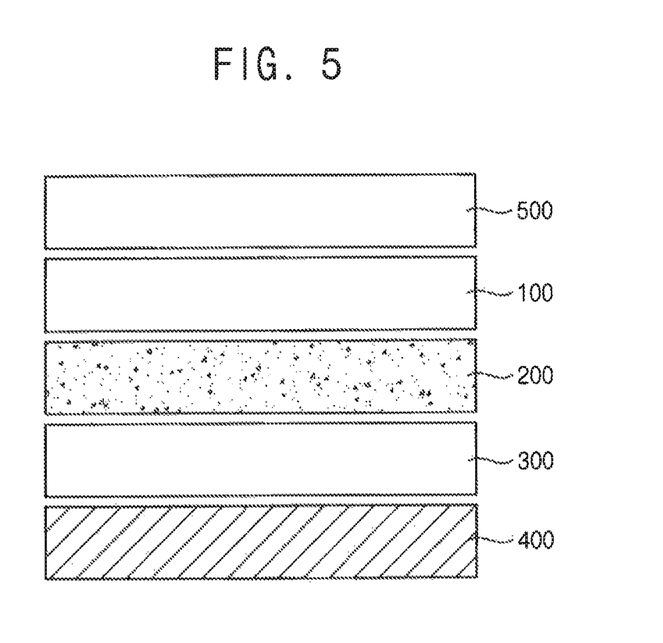
FIG. 5 is a cross-sectional view illustrating a display panel in FIG. 4, according to an exemplary embodiment of the present invention.

FIG. 4 is a perspective view illustrating a display panel including a speaker film in accordance with an exemplary embodiment of the present invention. FIG. 5 is a cross-sectional view illustrating a display panel in FIG. 4, according to an exemplary embodiment of the present invention.

The display panel and a display device having the display panel according to an exemplary embodiment of the present exemplary embodiment are substantially the same as the display panel and the display device described above with reference to FIGS. 1 to 3 except that the speaker film is disposed on a lower surface of a second substrate.

Referring to FIGS. 3 to 5, the display panel includes a main body and a speaker film 400. The main body includes a first substrate 100 and a second substrate 300 facing each other, and a liquid crystal layer 200 disposed between the first substrate 100 and the second substrate 300. The speaker film 400 is disposed on a lower surface of the second substrate 300.

The first substrate 100 and the second substrate 300 each may be a transparent insulation substrate. Examples of the first substrate 100 may be, but are not limited to, a glass substrate, a quartz substrate, a transparent resin substrate, etc. The liquid crystal layer 200 may be disposed between the first substrate 100 and the second substrate 300.

The speaker film 400 may be disposed on the lower surface of the second substrate 300.

The speaker film 400 may include a base substrate 410 and transparent electrodes 420 and 430 disposed on two opposite sides of the transparent base substrate 410.

The base substrate 410 may be a transparent insulation substrate or a non-transparent insulation substrate. The non-transparent insulation substrate may have a ceramic resin, a fluoro resin, etc. For example, the fluoro resin may include, but is not limited to, polytetrafluoroethylene PTFE, polychlorotrifluoroethylene PTFE, polychlorotrifluoroethylene PCTFE, polyvinylidene fluoride PVDF, polyvinyl fluoride PVF, etc.

The speaker film 400 is disposed on the lower surface of the display panel, and thus, the display quality of the display device may be maintained.

The transparent insulation substrate may be a glass substrate, a plastic substrate, etc. For example, the transparent insulation substrate may include a polymer. For example, the transparent insulation substrate may include, but is not limited to, polyethylene, polystyrene, polyethyleneterephthalate, polyester, polyacryl and polyepoxy.

The transparent electrodes 420 and 430 may include, but are not limited to, ITO, a conductive polymer, fullerene, a carbon nano tube complex, graphene, and silicene.

The speaker film 400 includes a first area 401, in which a speaker is formed, on an edge of the speaker film 400 and a second area 402 which is surrounded by the first area 401. The speaker film 400 is configured to vibrate a sound generated from the speaker.

The first area 401 has a width from the edge of the speaker film 400 toward the center of the speaker film 400. A speaker is formed on the edge of the speaker film 400, and the center of the speaker film 400 has an empty space. A sound generated from the speaker may be vibrated by the empty space.

Generally, a speaker generates a sound by magnetic induction between a permanent magnet and a coil. A display device has a space to dispose a speaker for generating a sound.

The display panel might not have a space to dispose a speaker. Thus, the thickness of the display device may be decreased.

When the speaker film 400 is disposed on a lower surface of the second substrate 300 of the display panel, the display quality of the display device may be maintained.

According to an exemplary embodiment of the present invention, the display device further includes an optical adhesive film between the first substrate 100 and the speaker film 400. The optical adhesive film may be an ultraviolet curable film. The ultraviolet curable film may include an acryl-based polymer, such as oligourethane acrylate, ester acrylate, etc.

In accordance with an exemplary embodiment of the present invention, a display device includes a display panel and a touch screen panel 500. The display panel comprises a main body having a first substrate 100 and a second substrate 300 facing each other, a liquid crystal layer 200 disposed between the first substrate 100 and the second substrate 300, and a speaker film 400 disposed on an upper surface of the first substrate 100. The touch screen panel 500 senses a touch position by detecting a change in capacitance.

The display device may further include a window on the touch screen panel 500. The window may be a transparent substrate.

The display device may further include a backlight assembly for providing light to the display panel.

Figure 6:
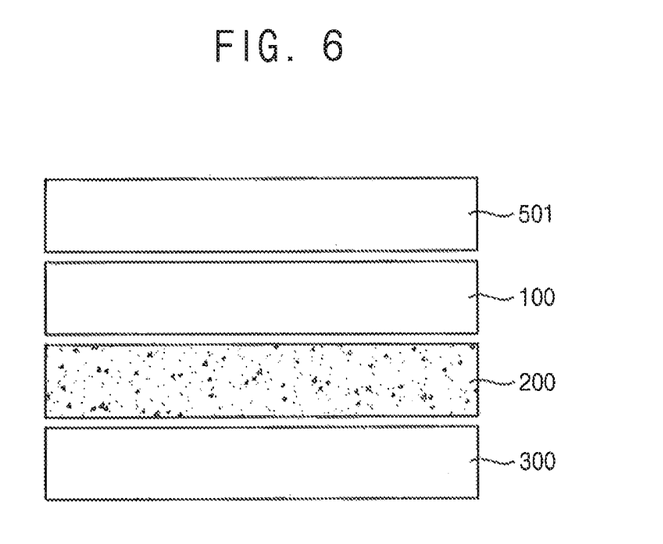
FIG. 6 is a cross-sectional view illustrating a display device including a speaker film in accordance with an exemplary embodiment of the present invention.

FIG. 6 is a cross-sectional view illustrating a display device including a speaker film in accordance with an exemplary embodiment of the present invention.

Figure 7:
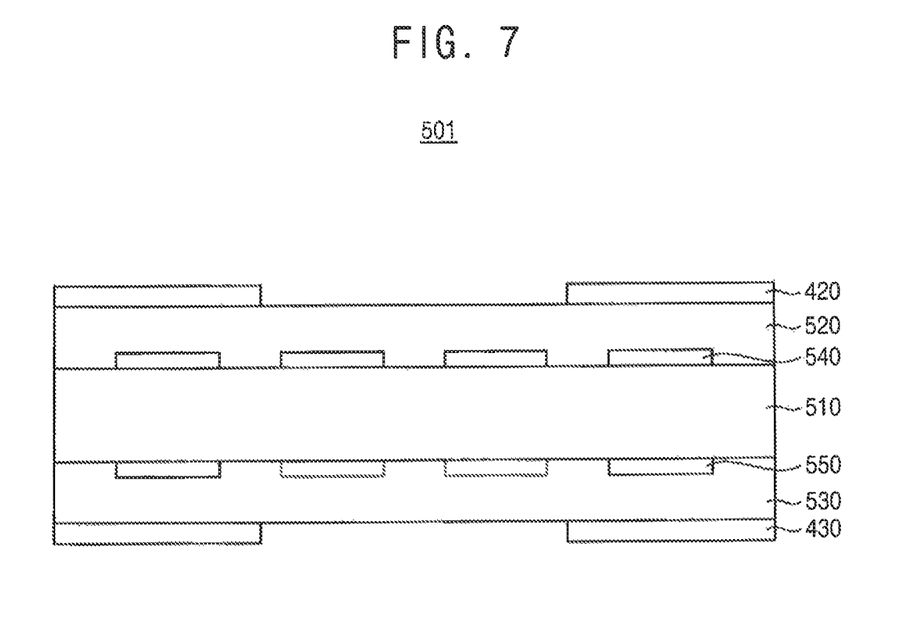
FIG. 7 is a cross-sectional view illustrating a touch screen panel including a speaker film in FIG. 6, according to an exemplary embodiment of the present invention.

FIG. 7 is a cross-sectional view illustrating a touch screen panel including a speaker film in FIG. 6, according to an exemplary embodiment of the present invention.

The display device is substantially the same as the display device described above with reference to FIGS. 1 to 5 except that the touch screen panel includes a speaker film.

Referring to FIG. 6, the display panel includes a first substrate 100 and a second substrate 300 facing each other, a liquid crystal layer 200 disposed between the first substrate 100 and the second substrate 300, and a touch screen panel 501 including a speaker film.

Referring to FIG. 7, the touch screen panel 501 includes a speaker film. A first electrode pattern 540 is patterned on a side surface of a base substrate 510. A second electrode pattern 550 is patterned on another side surface of the base substrate 510, which is an opposite side surface of the side surface where the first electrode pattern 540. The first electrode pattern 540 and the second electrode pattern 550 may sense a touch position by detecting a change in capacitance.

A speaker is patterned on the touch screen panel 501, and a separate space for the speaker might not be needed. Therefore, the thickness of the display device may be decreased.

The display device may further include a window on the touch screen panel 500. The window is a transparent substrate.

The display device may further include a backlight assembly for providing light to the display panel.

In accordance with an exemplary embodiment of the present invention, the display panel and the display device having the display panel may be a liquid crystal display panel and a liquid crystal display device, respectively. Alternatively, the display panel and the display device may be an organic light emitting device.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A display panel, comprising:
   a main body including a first substrate, a second substrate opposite the first substrate, and a liquid crystal layer disposed between the first substrate and the second substrate; and
   a speaker film disposed on an upper surface of the first substrate,
   wherein the speaker film comprises a transparent base substrate and transparent electrodes disposed on two opposite sides of the transparent base substrate,
   wherein each of the transparent electrodes has a rectangular ring shape including an empty space disposed at a center of the transparent base substrate, wherein each of the transparent electrodes covers an outer periphery of the transparent base substrate.

2. The display panel of claim 1, wherein the transparent base substrate comprises polyethylene, polystyrene, polyethyleneterephthalate, polyester, polyacryl, or polyepoxy.

3. The display panel of claim 1, wherein at least one of the transparent electrodes comprises ITO, conductive polymer, fullerene, carbon nano tube complex, graphene, or silicene.

4. The display panel of claim 1, wherein the speaker film comprises:
   a first area formed on an edge of the speaker film, wherein a speaker is formed in the first area, wherein the first area corresponds to the outer periphery of the transparent base substrate; and
   a second area surrounded by the first area, the second area configured to vibrate a sound generated from the speaker, wherein the second area corresponds to the center of the transparent base substrate.

5. The display panel of claim 1, further comprising an optical adhesive film between the first substrate and the speaker film.

6. A display device, comprising:
   a display panel, the display panel including:
      a main body having a first substrate, a second substrate opposite the first substrate, and a liquid crystal layer disposed between the first substrate and the second substrate; and
      a speaker film disposed on an upper surface of the first substrate, wherein the speaker film comprises a transparent base substrate and transparent electrodes disposed on two opposite sides of the transparent base substrate,
   wherein each of the transparent electrodes has a rectangular ring shape including an empty space disposed at a center of the transparent base substrate, wherein each of the transparent electrodes covers an outer periphery of the transparent base substrate; and
   a touch screen panel configured to sense a position of a touch.

7. A display panel, comprising:
   a main body including a first substrate, a second substrate opposite the first substrate, and a liquid crystal layer disposed between the first substrate and the second substrate; and a speaker film disposed on a lower surface of the second substrate, wherein the speaker film comprises a transparent base substrate and transparent electrodes disposed on two opposite sides of the transparent base substrate, wherein each of the transparent electrodes has a rectangular ring shape including an empty space disposed at a center of the transparent base substrate, wherein each of the transparent electrodes covers an outer periphery of the transparent base substrate.

8. The display panel of claim 7, wherein the transparent base substrate comprises polyethylene, polystyrene, polyethyleneterephthalate, polyester, polyacryl, or polyepoxy.

9. The display panel of claim 7, wherein the transparent electrode comprises ITO, conductive polymer, fullerene, carbon nano tube complex, graphene, or silicene.

10. The display panel of claim 7, wherein the speaker film comprises:
   a first area formed on an edge of the speaker film, wherein a speaker is formed in the first area, wherein the first area corresponds to the outer periphery of the transparent base substrate; and
   a second area surrounded by the first area, the second area configured to vibrate a sound generated from the speaker, wherein the second area corresponds to the center of the transparent base substrate.

11. The display panel of claim 7, further comprising an optical adhesive film between the first substrate and the speaker film.

12. A display device, comprising:
   a display panel, the display panel including:
      a main body having a first substrate, a second substrate opposite the first substrate, and a liquid crystal layer disposed between the first substrate and the second substrate; and
      a speaker film disposed on a lower surface of the second substrate; and
   a touch screen panel sensing a position of a touch,
   wherein the speaker film comprises a base substrate and transparent electrodes disposed on two opposite sides of the base substrate,
   wherein each of the transparent electrodes has a rectangular ring shape including an empty space disposed at a center of the base substrate, wherein each of the transparent electrodes covers an outer periphery of the base substrate.

13. A display device, comprising:
   a display panel including a first substrate, a second substrate opposite the first substrate, and a liquid crystal layer disposed between the first substrate and the second substrate; and
   a touch screen panel comprising a speaker film, the touch screen panel disposed on an upper surface of the first substrate,
   wherein the touch screen panel includes a base substrate, a first electrode pattern disposed on a first side of the base substrate, and a second electrode pattern disposed on a second side of the base substrate, wherein the first and second sides of the base substrate oppose each other,
   wherein the speaker film includes a first transparent electrode disposed on the first electrode pattern, and a second transparent electrode disposed on the second electrode pattern.

14. The display device of claim 13, wherein the base substrate is transparent.

15. The display device of claim 14, wherein the transparent base substrate comprises polyethylene, polystyrene, polyethyleneterephthalate, polyester, polyacryl, or polyepoxy.

16. The display device of claim 15, wherein at least one of the first and second transparent electrodes comprises ITO, conductive polymer, fullerene, carbon nano tube complex, graphene, or silicene.

17. The display device of claim 13, wherein the speaker film comprises:
   a first area formed on an edge of the speaker film, wherein a speaker is formed in the first area; and
   a second area surrounded by the first area, the second area configured to vibrate a sound generated from the speaker.

18. The display device of claim 13, further comprising an optical adhesive film between the first substrate and the speaker film.

* * * * *